United States Patent

Beccia et al.

[11] Patent Number: 5,209,526
[45] Date of Patent: May 11, 1993

[54] ROTARY JOINT ASSEMBLY

[75] Inventors: Ferdinando Beccia, Berkeley; Alfredo Conti, Mt. Ousley; Sam Yertutan, Dapto, all of Australia

[73] Assignee: Glastonbury Engineering Pty. Limited, Unanderra, Australia

[21] Appl. No.: 760,951

[22] Filed: Sep. 17, 1991

[51] Int. Cl.$^5$ ............................................. F16L 39/04
[52] U.S. Cl. ..................................... 285/134; 285/136; 285/111
[58] Field of Search ............... 285/141, 134, 136, 106, 285/111, 272, 275

[56] References Cited

U.S. PATENT DOCUMENTS

| | | | |
|---|---|---|---|
| 2,791,449 | 5/1957 | Monroe | 285/134 |
| 3,129,960 | 4/1964 | Schrodt | 285/134 |
| 3,484,853 | 12/1969 | Nishi | 285/134 |
| 4,065,159 | 12/1977 | Leroy et al. | 285/136 |
| 4,254,972 | 3/1981 | Wiedenbeck et al. | 285/134 |
| 4,477,107 | 10/1984 | Ferguson et al. | 285/134 |
| 4,478,435 | 10/1984 | Cheshier et al. | 285/39 |
| 4,606,560 | 8/1986 | McCracken | 285/134 |
| 4,635,969 | 1/1987 | Jackson | 285/134 |

*Primary Examiner*—Eric K. Nicholson
*Attorney, Agent, or Firm*—Edwin D. Schindler

[57] ABSTRACT

A rotary joint assembly is disclosed which includes a stator and a rotor, the stator having a stationary conduit for supplying a coolant through the joint assembly to a rotary body and the rotor being rotatable with respect to the stator and accommodating the motion of said rotary body, the rotary body having stationary and rotating parts, the rotary joint assembly being constructed in that: the stator includes a housing having integral elements for fixing the rotary joint assembly to a stationary part of the rotary body; the rotor further includes a carrier, within the housing, coaxial with and surrounding the conduit element, for attaching the rotary joint assembly to a rotating part of the rotary body; and stationary seal and bearing elements being secured to the stator and extending between the stator and rotor, providing a stationary seal for the rotary joint assembly against the coolant and providing bearing elements allowing rotation of the rotor with respect to the stator for accommodating the motion of the rotary body.

7 Claims, 6 Drawing Sheets

ROTARY JOINT ASSEMBLY

TECHNICAL FIELD

The present invention relates to a rotary joint suitable for use in any application where coolant, for example water, needs to be passed to a rotating component.

BACKGROUND ART

In many situations a coolant has to be delivered to a rotary body, for example, to the rollers of a steel slab casting mill where temperatures in excess of 1000° C. are encountered. The required coolant is supplied to the rollers through a rotary joint.

Though the invention will be described with particular reference to the above application (rotary joint delivering coolant water to a slab casting roller) it is to be understood that the invention has general application to situations where a liquid has to be supplied to a rotary body.

To supply coolant to a roller the stationary coolant supply has to be matched to the rotary motion of the roller. Moreover a required relationship has to be maintained between the coolant supply hoses and the rotary joint to reduce wear and prevent obstruction or failure of the supply hoses. The joint therefore has what will henceforth be referred to as a stator component and a rotor component. The stator allows connection to the stationary coolant supply while the rotor accommodates the rotary motion of the roller.

The roller is supported on bearings which require lubrication and this lubricant must be kept isolated from the coolant, which is generally water, to prevent bearing failure or reduced bearing life by contamination. A grease seal is therefore required between the rotor and the stator.

In the prior art these problems have been solved with complex joints exemplified by the rotary joints manufactured by Yamada Industrial Co. Ltd. of Japan and the Deublin Company of the U.S., Germany, and the UK.

One example of the Deublin design is shown schematically in FIG. 1, which shows a two-way water flow joint. The coolant supply is delivered to the rotary body (e.g. roller) along channel 10 surrounding pipe 12 from inlet 14 and returns through pipe 12 to outlet 16 (or vice versa). A one way flow rotary joint is provided by removing pipe 12 and plugging outlet 16. The rotor 18 is attached by threaded pipe to the rotary body. The rotor 18 is supported on ball bearings 20, 22 and sealing is provided by a rotary seal. A rotary seal comprises a rotating ceramic seal 24 in contact with a stationary carbon graphite (or tungsten carbide) seal 26, the latter pressed into and maintained in contact with the rotating seal 24 by a stainless steel wave spring 28. To work, the seal faces must be maintained in contact with a substantially constant force and the faces need to be well mated. To achieve the latter result the seal faces are ground "optically flat" (to better than 0.000023").

Similarly, in the Yamada design as shown schematically in FIG. 2 coolant flows into inlet 40 along pipe 42 and returns within pipe 42 to exit from outlet 44 (or vice versa). A stationary shaft 46 supports the coolant supply head 48 and the rotor which in part comprises outer casing 50. The casing 50 rotates on a cermet dry bearing 52. The end cover 54 attaches the rotor to the rotary body (roller) with which the joint is to be used. A rotary seal isolates the end cover 54 from the stationary shaft 46 and comprises a "micro-lapped" ceramic stationary seal 56 engaging a rotating "micro-lapped", floating seal 58. The seals 56, 58 are held in contact by spring 60. Again as in the Deublin design precision grinding of the faces of seals 56, 58 is required for effective operation of the seal and thus the joint.

These prior art rotary joints have a large number of parts. Failure of any one of these parts adversely affects the operation of the joint and in time will result in failure of the joint and contribute to failure of the bearings of the roller. In the harsh environment and high temperatures encountered in a slab caster the spring force may not always be optimal or uniform and dirt can work between and proceed to deteriorate the mated faces of the seals. This allows coolant to contaminate the rotary joint bearing(s) inducing bearing failure. In addition the coolant (being under pressure) is forced between any small gaps in the sealing faces (once formed) with great force greatly accelerating the attrition of the sealing faces. Under these conditions the spring may also become weakened by corrosion contributing further to the loss of the required sealing.

In addition both the Yamada and Deublin rotary joints require individual brackets to be made to fix the joint in place onto the bearing housing of the roller. This can be expensive in the case of a steel slab caster where hundreds of rollers are involved of varying sizes and there are normally one or two joints per roller. These joints are also long, a fact which presents a space problem in some applications and involves a large cantilever moment which must be considered when supporting the joint.

DISCLOSURE OF THE INVENTION

The present invention seeks to overcome the disadvantages in the prior art or at least to substantially ameliorate them by providing an alternative rotary joint assembly.

It is an object of the invention to provide a rotary joint assembly with integral supporting means.

It is a further object of the invention to provide a rotary joint assembly with a stationary seal for the rotor.

It is an object of the invention to provide a rotary joint assembly without the need for a rotor seal with precision lapped sealing faces.

According to the invention, there is provided a rotary joint assembly comprising a stator and a rotor, the stator having stationary conduit means for supplying a coolant through said joint assembly to a rotary body and the rotor being rotatable with respect to said stator and accommodating the motion of said rotary body, the rotary body having stationary and rotating parts, the rotary joint assembly being characterized in that: the stator comprises a housing having integral means for fixing the rotary joint assembly to a stationary part of the rotary body; the rotor comprises carrier means, within said housing, coaxial with and surrounding said conduit means, for attaching said rotary joint assembly to a rotating part to the rotary body; and stationary seal and bearing means secured to said stator and extending between said stator and rotor, providing a stationary seal for the rotary joint assembly against said coolant and providing bearing means allowing rotation of said rotor with respect to said stator for accommodating the motion of said rotary body.

Preferably, the stationary seal is made of nitrile.

BRIEF DESCRIPTION OF THE DRAWINGS

Preferred embodiments of the invention will now be described with respect to the following drawings in which.

PREFERRED MODES OF CARRYING OUT THE INVENTION

Figure 1:
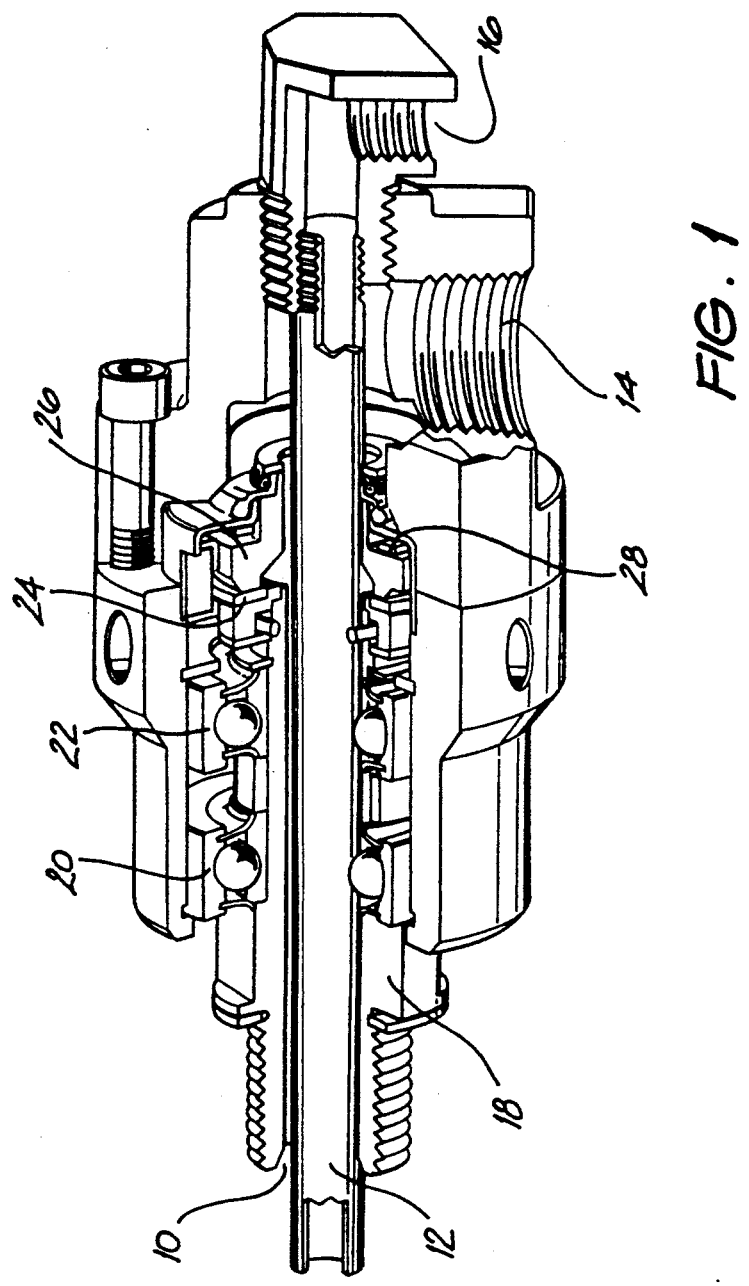
FIG. 1 is a schematic view of a first prior art rotary joint.
Figure 2:
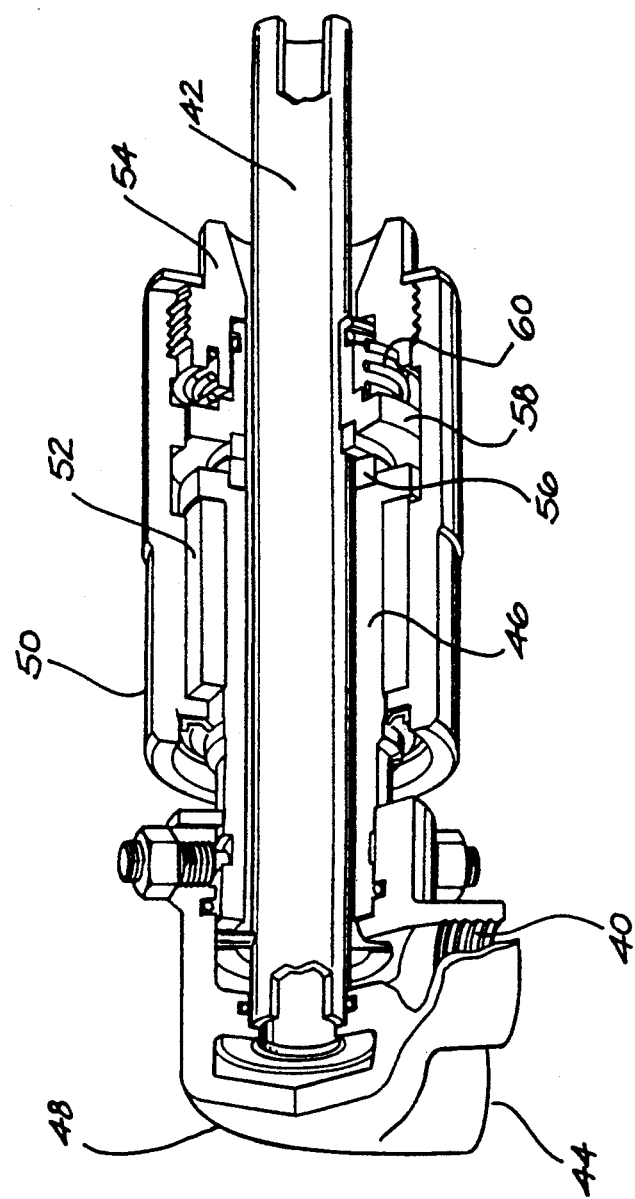
FIG. 2 is a schematic view of a second prior art rotary joint.
Figure 3:
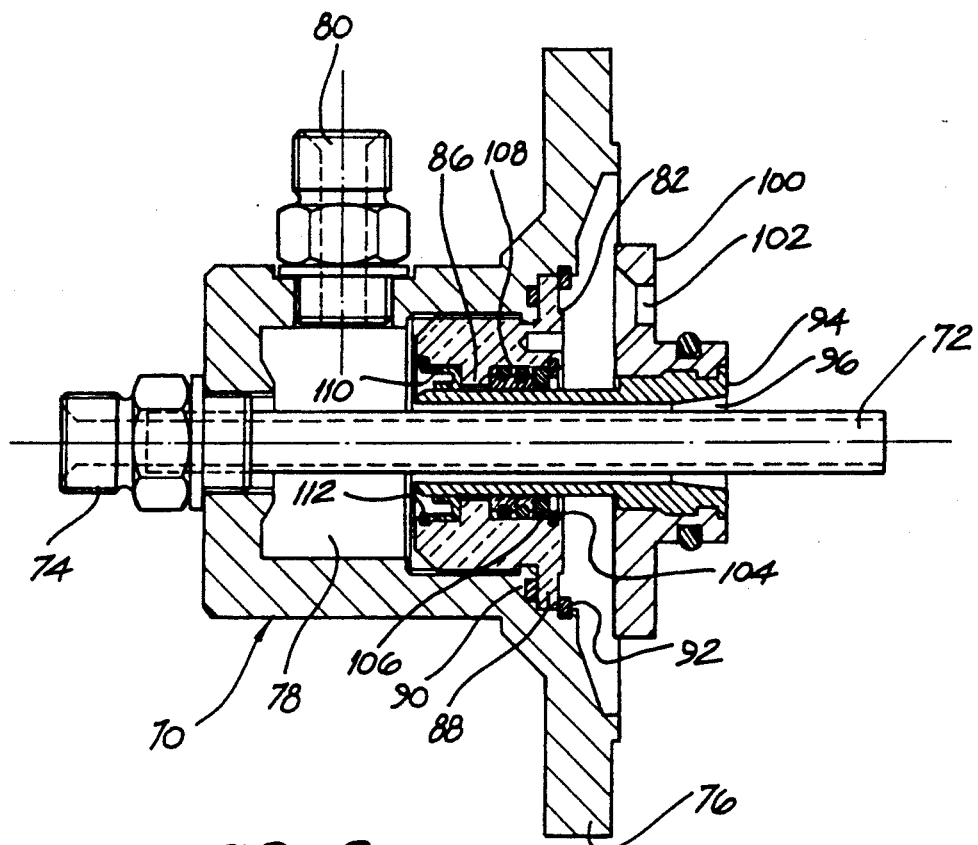
FIG. 3 is a schematic cross-sectional view of a first embodiment of a rotary joint according to the invention.
Figure 4:
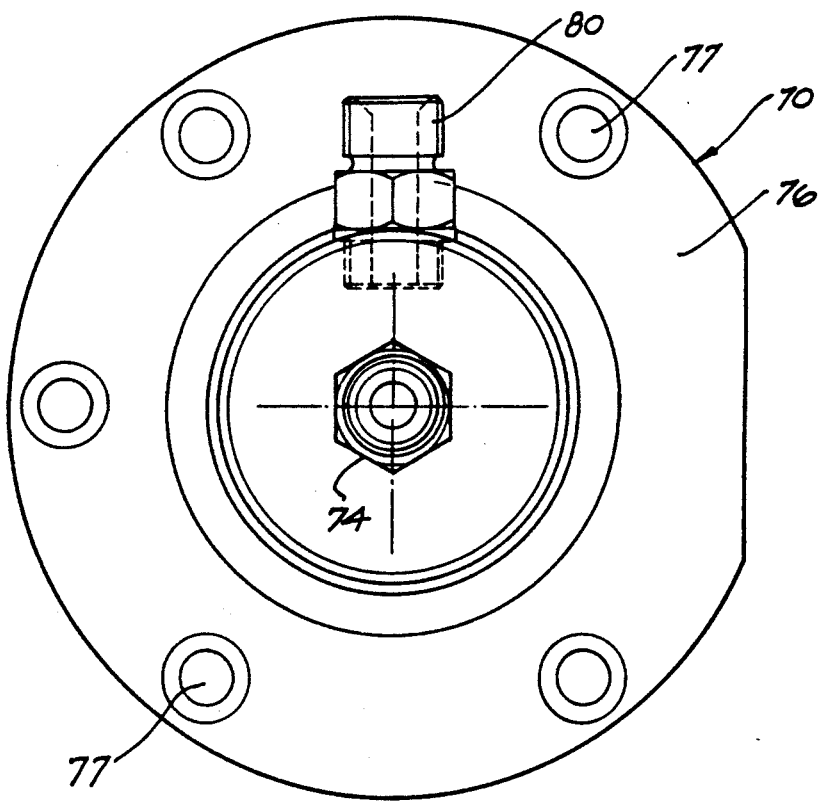
FIG. 4 is a schematic end elevation view of FIG. 3.

As shown in FIGS. 3 and 4, a first embodiment of the rotary joint comprises an outer casing 70 made of mild steel. A coolant supply pipe 72 extends from the rear of the casing 70 from inlet nipple 74. The casing has a flange 76 and an internal chamber 78, the latter coaxial with the pipe 72. Flange 76 as shown in FIG. 4 has a number of holes for attaching the joint assembly to the bearing housing (not shown) by threaded bolts 77. The chamber 78 communicates with outlet nipple 80.

A screw-threaded, bronze bush 82 is accommodated in chamber 78 towards the flange 76. The bush 82 has a bore 84 with a annular extension 86. A flange 88 of the bush 82 resting on O-ring 90 is held in place in the casing 70 by circlip 92.

A spigot 94, coaxial with and having an internal diameter sized to be spaced from pipe 72, creates a passage 96 about the pipe 72 for the return of the coolant into chamber 78. One end of the spigot 94 fits within the bush 82 past extension 86 the other end extends from the bush 82 beyond the flange 76 and supports spigot flange 100. Spigot flange 100 has a number of holes 102 to allow the spigot 94 to be secured to the roller.

The working tolerance between spigot 94 and bush 82 is sealed by front seal 108 and rear, main seal 110. Front seal 108 is a double O-ring grease seal held in place by circlip 104 and spacer 106. The double O-ring 108 rests on the right face (as seen in FIG. 3) of extension 86 which acts as a carrier bush for the O-ring. Behind extension 86 is the main water seal 110 held in place by circlip 112. The seal 110 is made of any suitable material usable in a water environment such as one made of nitrile. This seal according to the present invention acts also as the "bearing" for the spigot 94, the rotor of the joint. No separate bearing is required as in the prior art.

Figure 3A:
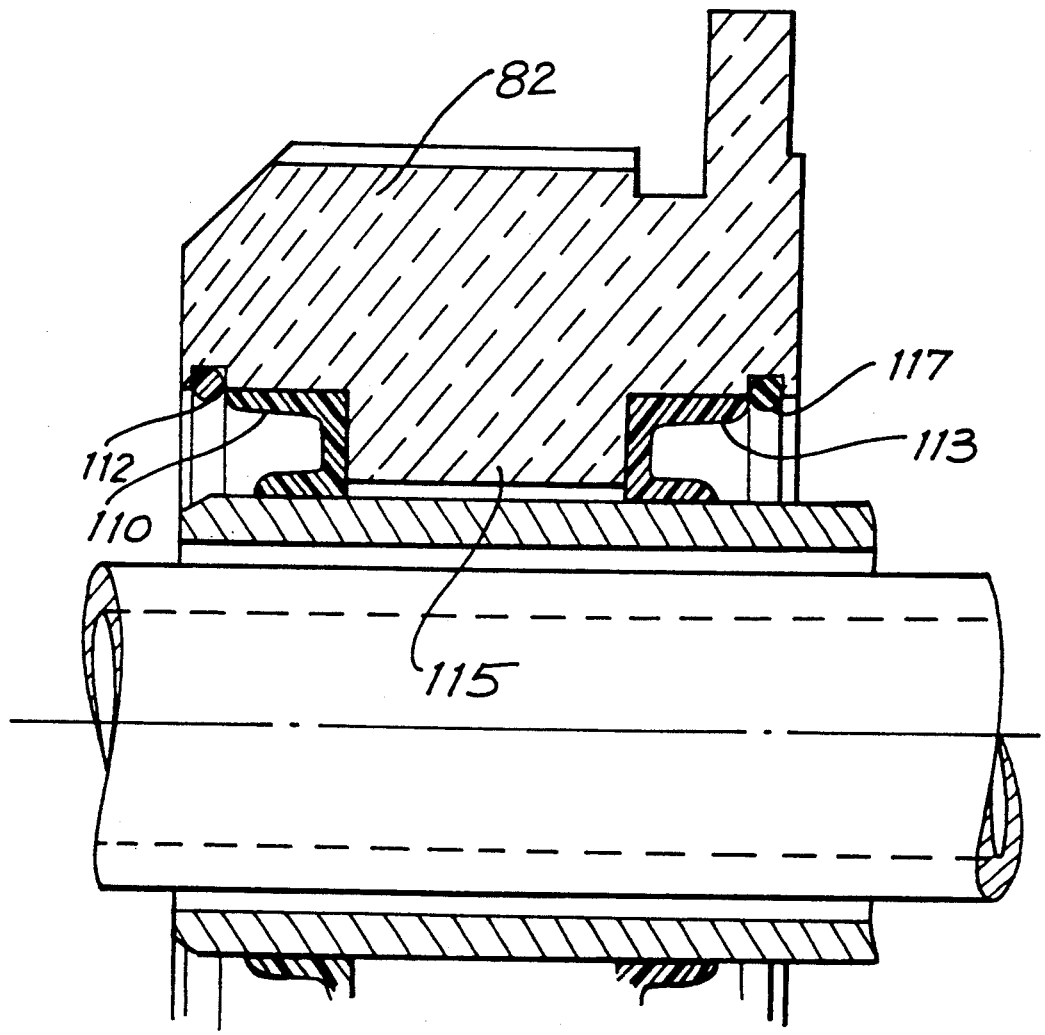
FIG. 3a shows a modification to the grease seal arrangement of FIG. 3.

A modification to the grease seal arrangement in FIG. 3 is shown in FIG. 3a. The O-rings 108 and O-ring carrier bush 86 are replaced by grease seal 113 (of the same form as seal 110 which remains the same as for FIG. 3) and a thicker carrier bush 115. Spacer 106 is deleted and circlip 117 performs the same function as circlip 104. With this modification, the rotary joint assembly is simplified while increasing the commonality of parts required.

The spigot 94 is made of any material well known in the art for the purpose to which the joint is to be put, for example when used as a rotary joint delivering water for cooling a slab caster roller, stainless steel has been found suitable. The spigot may also be chromium plated to increase its durability.

FIGS. 3 and 4 illustrate a dual flow rotary joint. To convert the rotary joint assembly to single flow, the outlet nipple 80 is capped with a plug (cf. item 134 of FIG. 6).

Figure 5:
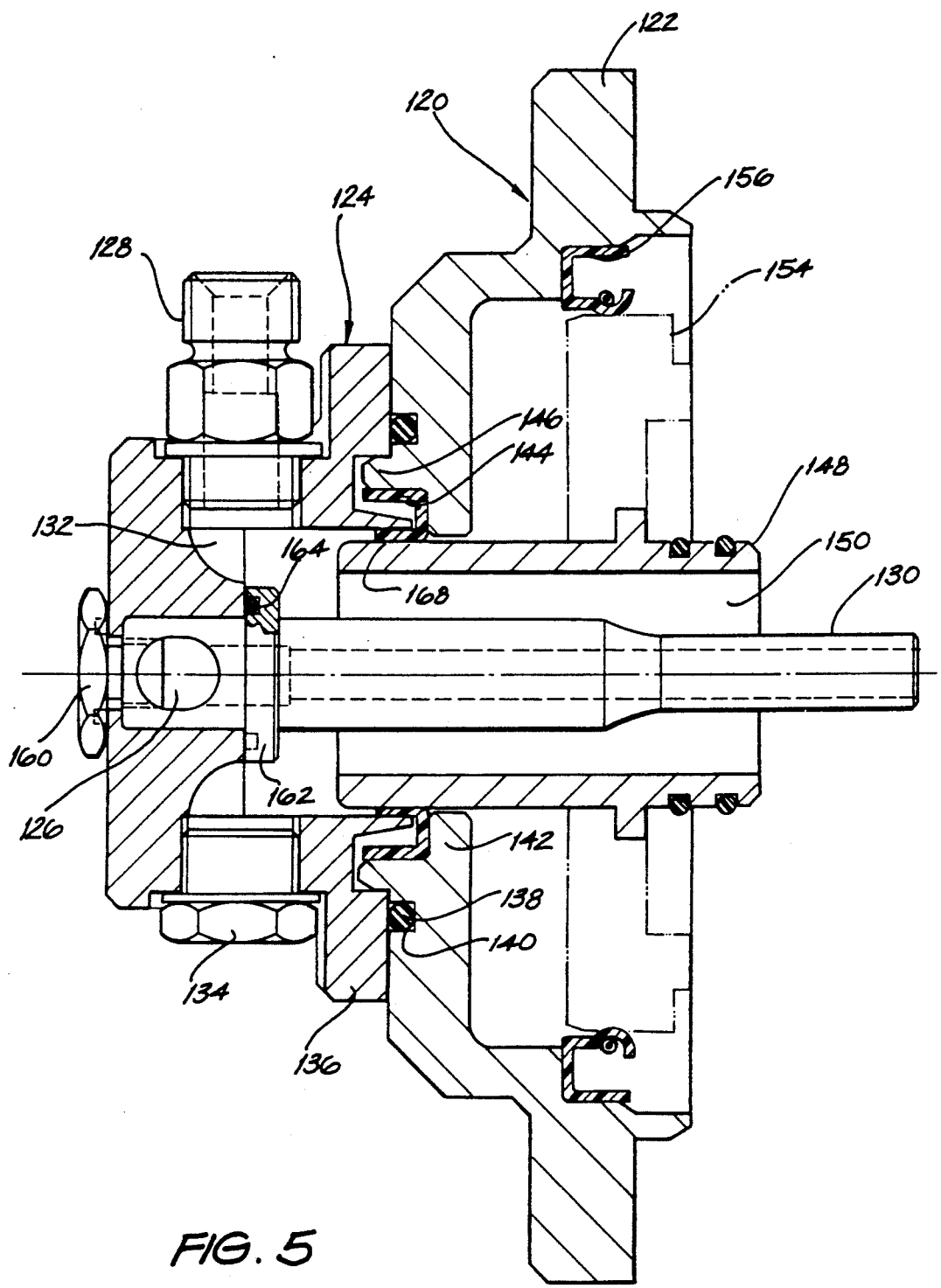
FIG. 5 is a schematic cross-sectional view of a second embodiment of a rotary joint according to the invention.
Figure 6:
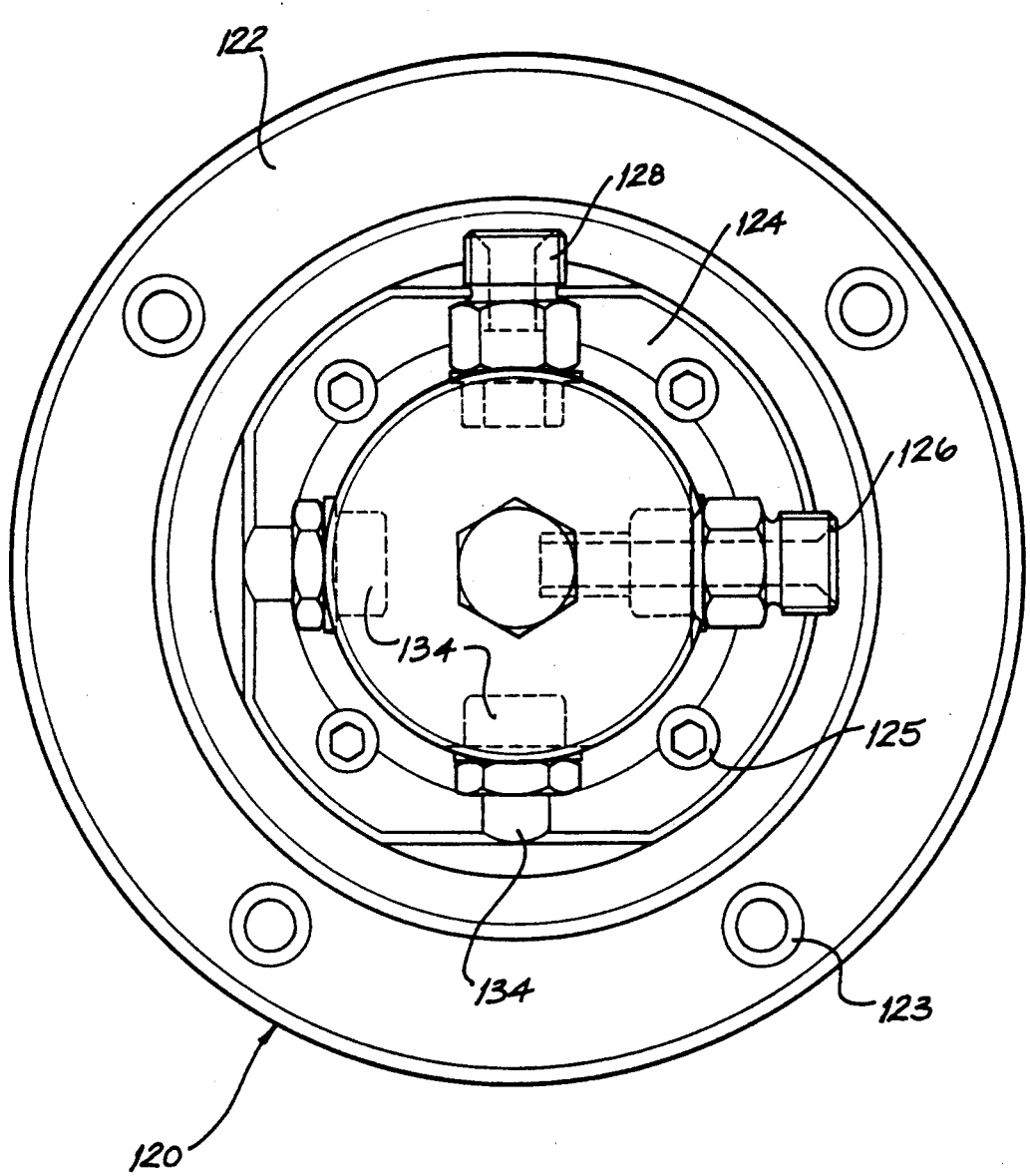
FIG. 6 is a schematic end elevation view of FIG. 5.

With reference to FIGS. 5 and 6 a second embodiment of the invention will now be described. The joint casing is made in two detachable parts, the first and frontispiece 120, with flange 122 for securing by screw-threaded bolts 123 the joint to the bearing housing of a roller, and the second, detachable rear end piece 124. The frontispiece 120 is detachably secured to end part 124 by Allen-headed screws 125. End piece 124 has inlet nipple 126 and outlet nipple 128, the inlet nipple communicating with the interior of pipe 130 and the outlet nipple communicating with the chamber 132. The chamber 132 is formed between the pipe 130 and the wall of end piece 124. Blanking plug 134 illustrates the manner of closing an inlet or outlet nipple to form a joint with a one way coolant flow.

End piece 124 is bolted to frontispiece 120 about flange 136 and sealed thereto by O-ring 138 held in groove 140. Radially interior of the flange 136 a ledge 142 is cut in the end piece 124. The ledge 142 accommodates a seal 144 and a rearwardly projecting flange 146 of frontispiece 120. Seal 144 is the main water seal for the joint. A cylindrical bearer 148 fits about the pipe 130 creating a passage 150 for the return coolant flow. The bearer 148 is held in place by annulus 152 of frontispiece 120, the edge of the bearer resting in contact with the seal 144. The seal 144 is made, for example from nitrile, or can be made of any other suitable material usable for this purpose well known in the art.

The bearer 148 supports the end cap 154 (shown in dotted outline) of the roller (not shown) and is the rotor (as above defined) for the joint. Grease seal 156 is accommodated between frontispiece 120 and the end cap 154.

The pipe 130 can be made integral with the end piece 124 or as a separate tube detachable from the end piece 124. In the latter situation the pipe 130 is held in place by screw thread retainer bolt 160 and O-ring 164.

The frontispiece 120 and end piece 124 of the casing are made of mild steel or other material commonly used therefor in the trade. The O-rings 138, 164 are made of nitrile, and the seal 156 is made of nitrile or other similar material used for the purpose. The bearer 148 is made of stainless steel and preferably has the end 168 which is in contact with seal 144 chromium plated and rounded or chamfered.

In operation the rotary joint is bolted to the roller by bolts about the flange 76, 122. The spigot 94, or bearer 148 is secured to the end cap (not shown) of the roller. In the latter case, the existing end cap may need to be modified to accommodate the bearer 148 while in the former case the spigot 94 is secured by flange 100 carried by the spigot 94. An inlet coolant hose is connected to the inlet nipple from a coolant supply manifold. Coolant flows along pipe 72,130 to the roller and returns along respective passage 96,150 into the chamber 78, 132 of the casing and out through outlet 80,128. In each case the seal 110, 144 acts to prevent mixing of the roller lubricant and the water coolant while acting as the bearing for the rotor(spigot 94, or bearer 148).

The length of the rotary joint is smaller than the prior art allowing the joint to be accommodated in more constricted spaces. The joint is simpler in construction. Moreover, the components of the joint are fewer and readily available. That is, precision lapping of the seal faces is not required.

The rotary joint has been designed to allow for thermal expansion of the rotary body. High temperatures associated with the slab casting process result in linear expansion of the roll. Thus, outer casing 70 (see FIG. 3) has sufficient internal clearance to allow for linear movement of spigot flange 100 and spigot 94. Equally, flange 122 (see FIG. 5) has sufficient internal clearance to allow linear movement of end cap 154 while rear end piece 124 has sufficient internal clearance to allow linear movement of cylindrical bearer 148.

Other advantages of the rotary joint assembly according to the invention are: the need to use various mounting brackets is avoided by providing a standard mounting; spare water inlet or outlet connections can be provided (as shown with reference to the second embodiment of FIGS. 5 and 6) adapting the joint to suit non-standard connections by simply rotating the stator end piece with respect to the frontispiece; while the stator acts as the main mounting bracket for fixing the rotary joint to the roller bearing housing it additionally provides a coolant chamber which acts as a reservoir for coolant within the joint assembly; and, a bearing is not required in the rotary joint assembly as only stationary water and grease seals are needed.

A number of variations are possible and the above description is illustrative only, and though the invention has been described above with respect to preferred embodiments thereof, other variations are contemplated within the knowledge of a person skilled in the art.

We claim:

1. A rotary joint assembly, comprising a stator and a rotor, said stator having stationary conduit means for supplying a coolant through a joint to a rotary body and said rotor begin rotatable with respect to said stator and accommodating motion of said rotary body, said rotary body having stationary and rotating parts;

said stator further comprising a housing having integral means for fixing said rotary joint assembly to a stationary part of said rotary body;

said rotor further comprising carrier mean, within said housing, coaxial with and surrounding said conduit means, for attaching said rotary joint assembly to a rotating part of said rotary body; and, stationary seal and bearing means being secured to said stator and extending between said stator and said rotor for providing a stationary seal for said rotary joint assembly against coolant and providing bearing means for allowing rotation of said rotor with respect to said stator for accommodating ht motion of said rotary body.

2. The rotary joint assembly as claimed in claim 1, wherein said housing comprises two parts, a frontispiece and an end piece, with said means for fixing being included with said frontispiece and said conduit means being included with said end piece.

3. The rotary joint assembly as claimed in claim 1, wherein said stator further comprises bush means between said housing of said stator and said rotor, said stationary seal and bearing means being carried by said bush means.

4. The rotary joint assembly as claimed in claim 3, wherein said carrier means at one end extends within said bush means and, at the other end, is attached to said rotary body by flange means.

5. The rotary joint assembly as claimed in claim 2, wherein said stationary seal and bearing means is secured between said frontispiece and said end piece.

6. The rotary joint assembly as claimed in claim 4, wherein said stationary seal and bearing means is made of nitrile.

7. The rotary joint assembly as claimed in claim 5, wherein said stationary seal and bearing means is made of nitrile.

* * * * *